(12) United States Patent
Miyazaki et al.

(10) Patent No.: US 10,481,300 B2
(45) Date of Patent: Nov. 19, 2019

(54) MIRROR SURFACE DECORATIVE SHEET HAVING CRACK ELONGATION AND SPECIFIED SURFACE ROUGHNESS, AND MIRROR SURFACE DECORATIVE PLATE USING SAME

(71) Applicant: Dai Nippon Printing Co., Ltd., Tokyo (JP)

(72) Inventors: Saori Miyazaki, Tokyo (JP); Chigusa Kuriyama, Tokyo (JP); Satoshi Furuta, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 218 days.

(21) Appl. No.: 15/126,808

(22) PCT Filed: Mar. 19, 2015

(86) PCT No.: PCT/JP2015/058259
§ 371 (c)(1),
(2) Date: Sep. 16, 2016

(87) PCT Pub. No.: WO2015/141781
PCT Pub. Date: Sep. 24, 2015

(65) Prior Publication Data
US 2018/0128944 A1 May 10, 2018

(30) Foreign Application Priority Data
Mar. 19, 2014 (JP) .................................. 2014-056915

(51) Int. Cl.
*B32B 27/06* (2006.01)
*B32B 27/16* (2006.01)
(Continued)

(52) U.S. Cl.
CPC .................. *G02B 1/14* (2015.01); *B32B 7/00* (2013.01); *B32B 7/02* (2013.01); *B32B 27/06* (2013.01);
(Continued)

(58) Field of Classification Search
CPC ........ A45D 42/24; B32B 27/08; B32B 27/16; B32B 27/20; B32B 27/26;
(Continued)

(56) References Cited

U.S. PATENT DOCUMENTS 8,801,888 B2    8/2014   Saitou
2007/0231583 A1* 10/2007 Ilzuka .................... B32B 27/10
                                                                428/423.7
(Continued)

FOREIGN PATENT DOCUMENTS

CN     103108704 A      5/2013
JP     2007-204966 A    8/2007
(Continued)

OTHER PUBLICATIONS

International Search Report dated Jun. 9, 2015, issued for PCT/JP2015/058259.
(Continued)

*Primary Examiner* — Jennifer D. Carruth
*Assistant Examiner* — Ryan S Dunning
(74) *Attorney, Agent, or Firm* — Locke Lord LLP

(57) ABSTRACT

The present invention provides a mirror surface decorative sheet having excellent specularity, excellent surface properties, and excellent processability in which neither springback nor cracking occurs during the processing steps, and a mirror surface decorative plate using this mirror surface decorative sheet. The present invention relates to a mirror surface decorative sheet comprising at least a base sheet and a surface-protecting layer, and having a crack elongation as (Continued)

measured by a predetermined method of 10 to 20%, the base sheet being formed of a polypropylene resin, the base sheet having a thickness of 150 to 500 μm, and the base sheet having a ten-point mean roughness (Rzjis) of a surface as measured according to JIS B 0601: 2001 of 5 μm or less, the surface-protecting layer being a cured product of an ionizing radiation-curable resin composition, the surface-protecting layer having a thickness of 7 to 17 μm.

12 Claims, 2 Drawing Sheets

(51) Int. Cl.
*G02B 1/04* (2006.01)
*G02B 1/12* (2006.01)
*G02B 5/08* (2006.01)
*G02B 1/14* (2015.01)
*B32B 27/32* (2006.01)
*B32B 7/00* (2019.01)
*B32B 7/02* (2019.01)
*B32B 27/08* (2006.01)
*B32B 27/28* (2006.01)
*C08J 7/04* (2006.01)
*E04F 13/08* (2006.01)

(52) U.S. Cl.
CPC .............. *B32B 27/08* (2013.01); *B32B 27/16* (2013.01); *B32B 27/28* (2013.01); *B32B 27/32* (2013.01); *C08J 7/045* (2013.01); *G02B 1/04* (2013.01); *G02B 5/08* (2013.01); *B32B 2307/40* (2013.01); *B32B 2307/416* (2013.01); *B32B 2307/536* (2013.01); *B32B 2307/538* (2013.01); *B32B 2307/581* (2013.01); *B32B 2451/00* (2013.01); *B32B 2551/08* (2013.01); *C08J 2323/12* (2013.01); *E04F 13/0866* (2013.01); *G02B 5/0808* (2013.01)

(58) Field of Classification Search
CPC ........ B32B 2307/416; B32B 2307/536; B32B 2307/538; B32B 2310/0887; B32B 2323/10; B32B 2551/08; G02B 1/04; G02B 1/105; G02B 1/12; G02B 1/14; G02B 5/08; G02B 5/0808; G02B 5/0841; G02B 5/0866; G02B 26/0825
USPC ................ 359/838, 846–849, 870, 871, 883; 428/687
See application file for complete search history.

(56) References Cited

U.S. PATENT DOCUMENTS

| 2011/0143128 | A1* | 6/2011 | Saitou ................. | B29C 45/1418 |
| | | | | 428/336 |
| 2013/0101793 | A1 | 4/2013 | Saitou | |
| 2014/0272293 | A1 | 9/2014 | Saitou | |
| 2015/0252207 | A1* | 9/2015 | Ishikawa .................. | C09D 4/00 |
| | | | | 428/337 |

FOREIGN PATENT DOCUMENTS

| JP | 2008-088682 A | 4/2008 |
| JP | 2009-215873 A | 9/2009 |
| JP | 2011-213023 A | 10/2011 |
| JP | 2012-206375 A | 10/2012 |
| JP | 2012-210739 A | 11/2012 |
| JP | 2013-075381 A | 4/2013 |
| JP | 2013-078847 A | 5/2013 |
| JP | 2013-078941 A | 5/2013 |
| JP | 2013-226791 A | 11/2013 |

OTHER PUBLICATIONS

Extended European Search Report dated Oct. 9, 2017, for the corresponding European patent application No. 15765007.8.
Office Action dated Mar. 2, 2018, issued for the Chinese patent application No. 201580014745.6 and English translation thereof.

* cited by examiner

MIRROR SURFACE DECORATIVE SHEET HAVING CRACK ELONGATION AND SPECIFIED SURFACE ROUGHNESS, AND MIRROR SURFACE DECORATIVE PLATE USING SAME

TECHNICAL FIELD

The present invention relates to a mirror surface decorative sheet and a mirror surface decorative plate using the same.

BACKGROUND ART

For architectural interior and exterior materials, building materials, furniture, and various components for home appliances etc., and in particular, kitchen products, bathroom shelves, and bathroom doors, base plates such as metal plates, inorganic plates (e.g., plaster board), and wood plates (e.g., MDF, particleboard, and laminated board), are used. On these plates are bonded together decorative sheets that are obtained by imparting aesthetic appearance to a plastic sheet used as a base material by applying a color, pattern, or unevenness. Due to a current increase in high-end consumers, specularity has also become an important performance required of these components, in addition to freshness and designability.

As a decorative sheet with specularity, a decorative sheet comprising a polyester film as a base material, a permeation-preventive layer, and a surface-protective layer in which an ionizing radiation-curable resin composition is cured by crosslinking has been proposed (e.g., Patent Literature (PTL) 1). However, when a decorative sheet in which a polyester film is used as a base material is used to wrap an adherend while heating (50 to 120° C.), the decorative sheet is softened and is likely to suffer from unevenness of a coating of a paste (adhesive) or surface irregularities of an adherend (i.e., "daku" in Japanese). This results in a decrease in specularity after being bonded to the adherend.

CITATION LIST

Patent Literature

PTL 1: JP2007-204966A

SUMMARY OF INVENTION

Technical Problem

The decrease in specularity after being bonded to an adherend can be overcome, for example, by thickening the base material or by providing a multi-layer configuration comprising a plurality of base materials. However, if a base material is thickened, a problem known as springback, i.e., detachment at an end face, which is likely to occur during the processing steps performed with respect to an adherend, may occur. Although a decorative sheet must have more than a certain degree of hardness to ensure specularity, if the sheet has more hardness than is necessary, the problem known as springback, i.e., detachment at an end face, which is likely to occur during the processing steps performed with respect to an adherend, may occur; thus, specularity and processability, which are opposing performances, must be satisfied at the same time.

Further, if the thickness of a base material is increased, production efficiency will considerably decrease, while the starting material and transportation costs increase. If a multi-layer configuration is provided, curling or interlayer delamination will undesirably occur due to the differences in heat resistance and shrinkability between the plurality of base materials.

The decrease in specularity may otherwise be overcome by further thickening the surface-protecting layer. However, the thickening of the surface-protecting layer will likely to cause cracking on the surface of a decorative sheet during bending work, V-grooving, or wrapping, which are required when a decorative sheet is bonded to an adherend with an adhesive.

The cracking on the surface of a decorative sheet may be reduced with the use of a soft resin in the formation of the surface-protecting layer of the decorative sheet. However, the various components mentioned above are also required to have surface properties, such as weather resistance, stain resistance, scratch resistance, and solvent resistance. Further, the surface-protecting layer is required to have more than a certain degree of hardness. Therefore, in order to inhibit the occurrence of cracking during the processing steps and the occurrence of cracking after the installation, and to satisfy the surface properties, opposing performances must be satisfied at the same time.

Furthermore, the various components mentioned above may possibly be exposed to heating. For example, a heated pot or a kettle may sometimes be directly, or via a pot stand, placed on a component of kitchen products, and the decorative sheet is thus required to have heat resistance as a surface property.

In view of such circumstances, an object of the present invention is to provide a mirror surface decorative sheet having excellent specularity, excellent surface properties, and excellent processability in which neither springback nor cracking occurs during the processing steps, and to provide a mirror surface decorative plate using this mirror surface decorative sheet.

Solution to Problem

As a result of extensive research to achieve the above object, the present inventors conducted extensive research, and found that the object can be accomplished by the following invention. More specifically, the present invention provides the following mirror surface decorative sheet, and mirror surface decorative plate using this mirror surface decorative sheet.

1. A mirror surface decorative sheet comprising at least a base sheet and a surface-protecting layer, and having a crack elongation as measured by the following method of 10 to 20%, the base sheet being formed of a polypropylene resin, the base sheet having a thickness of 150 to 500 μm, the base sheet having a ten-point mean roughness (Rzjis) of a surface as measured according to JIS B 0601: 2001 of 5 μm or less, the surface-protecting layer being a cured product of an ionizing radiation-curable resin composition, the surface-protecting layer having a thickness of 7 to 17 μm:

Measurement of Crack Elongation:

a rectangular test sample is prepared according to JIS K 7127 using a decorative sheet, placed in a temperature environment of 70° C., and pulled at an arbitrary elongation using a tensile tester at a tensile rate of 20 mm/min, an 80-mm distance between chucks, and a width of 25 mm; thereafter, the test sample between the chucks is colored with a whiteboard marker, the colored portion is wiped off with cloth, and the degree of elongation at which the color cannot be wiped off due to the occurrence of cracking is determined as a crack elongation.

2. A mirror surface decorative plate having a base plate, an adhesive layer, and the mirror surface decorative sheet of Item 1, in this order.

Advantageous Effects of Invention

The present invention makes it possible to obtain a mirror surface decorative sheet having excellent specularity, excellent surface properties, and excellent processability in which neither springback nor cracking occurs during the processing steps, and to obtain a mirror surface decorative plate using this mirror surface decorative sheet.

DESCRIPTION OF EMBODIMENTS

Mirror Surface Decorative Sheet

The mirror surface decorative sheet according to the present invention comprises at least a base sheet and a surface-protecting layer, and has a crack elongation as measured by a predetermined method of 10 to 20%, the base sheet being formed of a polypropylene resin, the base sheet having a thickness of 150 to 500 μm, the base sheet having a ten-point mean roughness (Rzjis) of a surface as measured according to JIS B 0601: 2001 of 5 μm or less, the surface-protecting layer being a cured product of an ionizing radiation-curable resin composition, and the surface-protecting layer having a thickness of 7 to 17 μm. The mirror surface decorative sheet of the present invention is described with reference to FIGS. 1 and 2.

In the mirror surface decorative sheet of the present invention, the surface refers to a "front surface" that is on a side opposite to that in contact with the adherend when the mirror surface decorative sheet of the present invention is used by being laminated on an adherend or the like, and the surface is visually recognized after lamination. As used herein, the direction toward this surface of the mirror surface decorative sheet of the present invention is sometimes referred to as "front" or "above," and a direction opposite to this direction is sometimes referred to as "rear" or "below."

Figure 1:
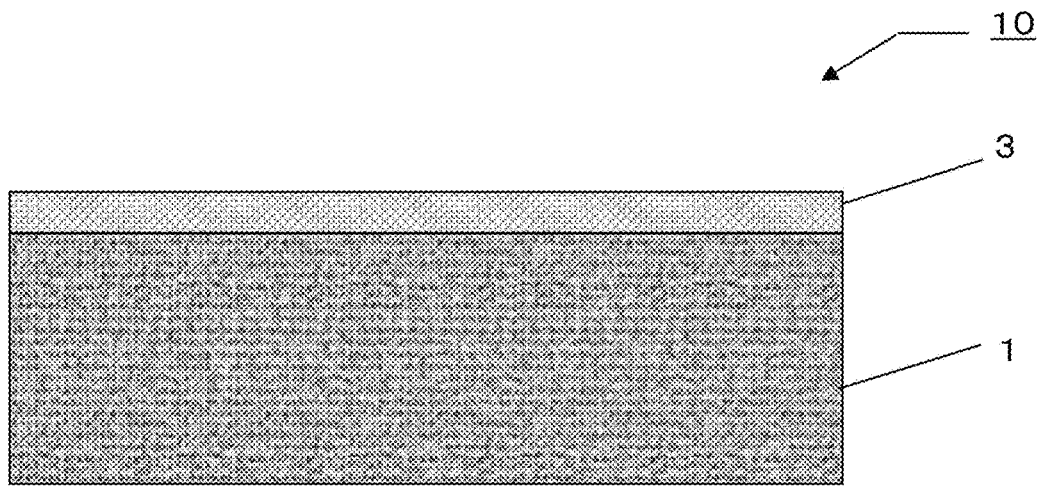
FIG. 1 is a schematic diagram showing a cross section of one embodiment of a mirror surface decorative sheet according to the present invention.
Figure 2:
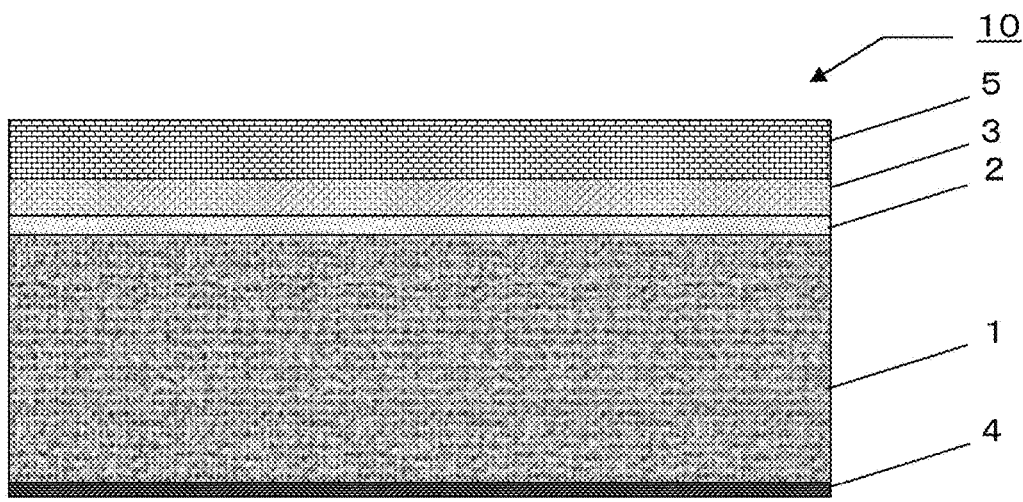
FIG. 2 is a schematic diagram showing a cross section of one embodiment of a mirror surface decorative sheet according to the present invention.

FIGS. 1 and 2 are schematic diagrams showing a cross section of one embodiment of a mirror surface decorative sheet according to the present invention. The mirror surface decorative sheet 10 of FIG. 1 comprises a base sheet 1 and a surface-protecting layer 3. The mirror surface decorative sheet shown in FIG. 2 comprises a base sheet 1, a primer layer 2, a surface-protecting layer 3, and a masking film 5 in this order, and further comprises a rear primer layer 4 on a side of the base sheet opposite to that comprising the surface-protecting layer (hereinafter sometimes simply referred to as a "rear surface").

The mirror surface decorative sheet of the present invention has a crack elongation as measured by the following method of 10 to 20%.

Measurement of Crack Elongation

A rectangular test sample is prepared according to JIS K 7127 using a decorative sheet, placed in a temperature environment of 70° C., and pulled at an arbitrary elongation using a tensile tester at a tensile rate of 20 mm/min, an 80-mm distance between chucks, and a width of 25 mm; thereafter, the test sample between the chucks is colored with a whiteboard marker, the colored portion is wiped off with cloth, and the degree of elongation at which the color cannot be wiped off due to the occurrence of cracking is determined as a crack elongation.

The whiteboard marker used in the above crack elongation measurement method is a whiteboard marker (Pentel, Nokkuru, blue, round core, middle shaped). After pulling, the coloring is performed on the entire portion between the chucks.

A crack elongation of less than 10% causes cracking on the surface of the mirror surface decorative sheet. A crack elongation exceeding 20% results in insufficient scratch resistance due to an overly soft surface of the mirror surface decorative sheet. The crack elongation is preferably 12 to 18%.

The crack elongation of the mirror surface decorative sheet of the present invention may be adjusted by adjusting the hardness of the surface-protecting layer. Specifically, the adjustment may be performed, for example, by adjusting the amount of application of an ionizing radiation-curable resin composition that forms the surface-protecting layer. An increase in the amount of application reduces the crack elongation, while a decrease in the amount of application increases the crack elongation.

The crack elongation of the mirror surface decorative sheet may also be adjusted by adjusting the ionizing radiation intensity in the formation of the surface-protecting layer. An increase in the ionizing radiation intensity hardens the surface-protecting layer and decreases the crack elongation, while a decrease in the ionizing radiation intensity softens the surface-protecting layer and increases the crack elongation.

It is also possible to adjust the crack elongation of the mirror surface decorative sheet by mixing a plurality of ionizing radiation-curable resins for forming the surface-protecting layer, and appropriately adjusting its mixing ratio to adjust the hardness of the surface-protecting layer.

Base Sheet

The base sheet is formed of a polypropylene resin. When a polypropylene resin is used, the base sheet is less likely to suffer from unevenness of a coating of a paste (adhesive) or surface irregularities of an adherend (i.e., "daku" in Japanese), even when the base sheet is made thinner; and it becomes possible to achieve excellent specularity and excellent production efficiency, while avoiding an increase in the starting material and transportation costs. Further, excellent surface properties, such as weather resistance, stain resistance, scratch resistance, solvent resistance, and heat resistance, are also obtained.

Preferred examples of the polypropylene resin include homopolypropylene resins, random polypropylene resins, block polypropylene resins, polypropylene resins with polypropylene crystals, $C_{2-20}$ α-olefin copolymers other than polypropylene resins with polypropylene crystals, and the like. In addition to the above, preferred examples also include propylene-α-olefin copolymers containing 15 mol % or more of ethylene, 1-butene, 1-hexene, 1-octene, 3-methyl-1-butene, 4-methyl-1-pentene, and the like, such as ethylene-propylene copolymers and ethylene-propylene-butene copolymers.

As a polypropylene resin, it is preferable to use a crystalline resin having a glass transition temperature (Tg) of −50 to 70° C. and a melting point (Tm) of 130 to 220° C. A crystalline resin used as the polypropylene resin constituting the base sheet has a stable crystal structure even in a temperature range exceeding the glass transition temperature (Tg), as long as it is below the melting point (Tm). Therefore, changes in flexibility due to changes in temperature are small, i.e., the flexibility depends little on temperature. For example, when the mirror surface decorative sheet is used to wrap an adherend while heating (50 to 120° C.), unevenness of a coating of a paste (adhesive) or surface irregularities of an adherend (i.e., "daku" in Japanese), are accommodated, and the specularity is not deteriorated after the decorative sheet is bonded to the adherend. Even when heating is locally performed, causing temperature unevenness, excellent specularity is maintained.

The polypropylene resin as a crystalline resin preferably has a glass transition temperature (Tg) of −50 to 70° C. When the glass transition temperature (Tg) is lower than −50° C., the specularity may not be obtained; and when it exceeds 70° C., the specularity or heat resistance may not be obtained. The glass transition temperature (Tg) is more preferably −20 to 50° C. to obtain excellent specularity and heat resistance.

The glass transition temperature (Tg) as used herein is a value measured according to JIS K 7121-1987. Specifically, the base sheet is used as a test sample, and the test sample is heated from a room temperature at a rate of 20° C./min., and a calorific value is measured with a differential scanning calorimeter (DSC) to obtain an endotherm or exothermic curve. Extension lines are respectively drawn at the linear portions before and after the inflection points, and the intersection of the endotherm or exothermic curve with a ½ straight line drawn between the extension lines is considered as Tg.

The melting point (Tm) of polypropylene resin as a crystalline resin is preferably 130 to 220° C. When the melting point (Tm) is lower than 130° C., excellent specularity may not be obtained. When the melting point (Tm) exceeds 220° C., springback may occur during the processing steps performed with respect to, in particular, an adherend that has a curved surface, and excellent processability may not be achieved. To achieve excellent specularity and processability, the melting point (Tm) is more preferably 130 to 200° C.

The melting point (Tm) as used herein is a value measured according to JIS K 7121-1987. Specifically, a base sheet used as a test sample is heated at a rate of 10° C./min from a room temperature to a temperature 30° C. higher than that at the end of the melting peak, and maintained for 10 minutes, followed by cooling to 40° C. at a rate of 10° C./min. The same heating and cooling are repeated again, and the temperature at the top of the melting peak in the obtained DSC curve is considered to be the melting point (Tm). When the DSC curve has a plurality of endothermic peaks, the temperature at the top of an endothermic peak with the largest area is referred to.

The base sheet has a thickness of 150 to 500 μm. When the thickness is less than 150 μm, specularity cannot be obtained; and when it is bonded to an adherend, the adherend cannot be sufficiently concealed, resulting in a decrease in designability. When the thickness exceeds 500 μm, springback is likely to occur, the production efficiency is decreased, and the starting material and transportation costs increase. From the same viewpoint, the base sheet preferably has a thickness of 200 to 400 μm, and more preferably 220 to 300 μm.

The base sheet has a ten-point mean roughness (Rzjis) of a surface measured according to JIS B 0601: 2001 of 5 μm or less. When it is greater than 5 μm, specularity cannot be obtained. To achieve excellent specularity and excellent production stability, the ten-point mean roughness (Rzjis) is preferably 1 to 5 μm, and more preferably 2.5 to 4.5 μm. The ten-point mean roughness (Rzjis) of a base sheet may be adjusted in accordance with, for example, the quality of the material of a roll used when a film is formed. The ten-point mean roughness (Rzjis) is measured according to JIS B 0601: 2001, and may be measured by using, for example, a surface roughness meter, such as a contact surface roughness meter or non-contact surface roughness meter.

The base sheet has a hardness of preferably 700 to 2100 MPa, and more preferably 900 to 2000 MPa. When the base sheet is too hard, springback may occur; when it is too soft, surface irregularities of an adherend cannot be accommodated, possibly decreasing the specularity of the mirror surface decorative sheet.

The hardness degree (hardness) used in this specification is a value measured by the following measurement method. Specifically, the hardness degree is a tensile elastic modulus (E) calculated according to the following formula based on the first linear part of a tensile stress-strain curve that is obtained by preparing a test sample punched into a dumbbell shape according to JIS K 7127, and carrying out a measurement at 25° C. using a tensile tester at a tensile rate of 50 mm/min, an 80-mm distance between chucks, and a width of 10 mm.

Tensile elastic modulus=$\Delta \rho / \Delta \varepsilon$ $\Delta \rho$: Difference in stress according to an original average cross-sectional area of two points on a straight line $\Delta \varepsilon$: Difference in strain between the same two points The base sheet is preferably colored with a colorant. When colored, the base sheet is capable of concealing an adherend base layer, such as a base plate, on which the decorative sheet is provided; at the same time, excellent designability is obtained.

Specific examples of colorants usable for the base sheet include inorganic pigments, such as carbon black (India ink), iron black, titanium white, antimony white, chrome yellow, titanium yellow, red iron oxide, cadmium red, ultramarine blue, and cobalt blue; organic pigments and dyes, such as quinacridone red, isoindolinone yellow, and phthalocyanine blue; metallic pigments made of a flaky foil strip of aluminum, brass, and the like; and pearlescent pigments made of a flaky foil strip of titanium dioxide-coated mica, basic lead carbonate, and the like; and the like.

The amount of the colorant used is not particularly limited as long as it does not decrease the film formability or mechanical strength at the time that the base sheet is obtained by extrusion molding.

The resin materials used to form the base sheet may include additives, as required. Examples of additives include fillers, retardants, anti-oxidants, lubricants, foaming agents, ultraviolet absorbers, light stabilizers, and the like.

Of the additives above, inorganic fillers, such as calcium carbonate, barium sulfate, clay, and talc, are preferable to achieve excellent processability. These inorganic fillers may be contained in an amount within a range of 1 to 60 mass %, with respect to base sheet.

The base sheet of the mirror surface decorative sheet of the present invention may comprise a plurality of layers.

When the base sheet comprises a plurality of layers, the layer structure of the base sheet may be, for example, such that a base resin layer and a support resin layer are formed in this order from the above (from the surface-protecting layer side).

Figure 3:
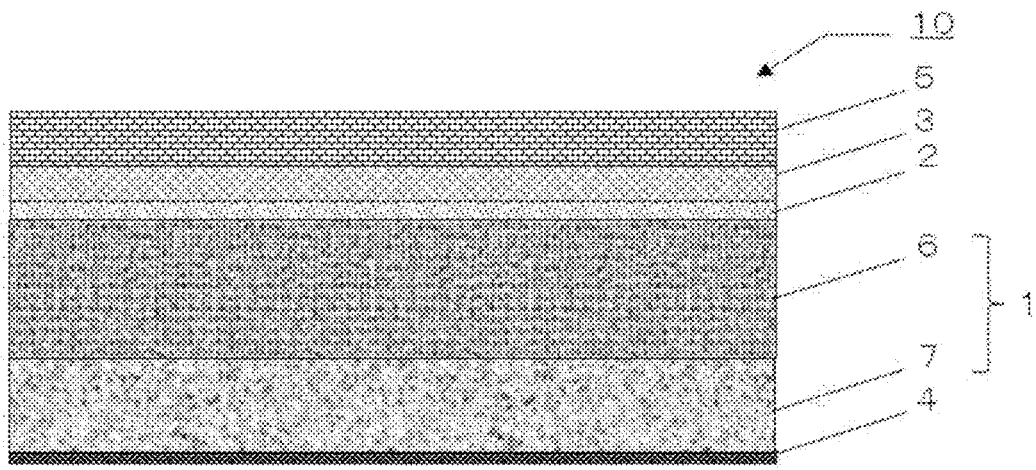
FIG. 3 is a schematic diagram showing a cross section of one embodiment of a mirror surface decorative sheet according to the present invention.

FIG. 3 is a schematic diagram showing a cross section of one embodiment of a mirror surface decorative sheet according to the present invention in which the base sheet comprises a plurality of layers. In the mirror surface decorative sheet 10 shown in FIG. 3, the base sheet 1 comprises two layers, i.e., a base resin layer 6 and a support resin layer 7 are formed in this order from the above (from the surface-protecting layer 5 side).

A polypropylene resin, colorant, additives, and the like used as resin materials for constituting the base resin layer are the same as those described above in relation to the base sheet. The ten-point mean roughness (Rzjis) of a surface of the base resin layer is also the same as that described above in relation to the base sheet.

The base resin layer has a thickness of preferably 100 to 300 μm, and more preferably 120 to 270 μm. When the thickness of the base resin layer is within this range, a mirror surface decorative sheet with more excellent specularity is obtained.

The base resin layer has a hardness of preferably 700 to 1600 MPa, and more preferably 800 to 1500 MPa. When the hardness of the base resin layer is within this range, the hardness at the surface side of the mirror surface decorative sheet is improved, and more excellent specularity of the mirror surface decorative sheet is obtained.

The polypropylene resin used as a resin material for constituting the support resin layer may be suitably selected from those described above in relation to the base sheet so that the hardness degree is within the range stated below. The colorant, additives, and the like may also be the same as those mentioned above in relation to the base sheet. When the base resin layer is colored, the support resin layer may be transparent.

The support resin layer has a thickness of preferably 60 to 200 μm, and more preferably 80 to 160 μm. A support resin layer thickness within this range enables the support resin layer to accommodate, for example, surface irregularities of an adherend, and a mirror surface decorative sheet with more excellent specularity is obtained.

The support resin layer has a hardness of preferably 400 to 1000 MPa, and more preferably 500 to 900 MPa. A support resin layer hardness within this range enables the support resin layer to accommodate, for example, surface irregularities of an adherend, and a mirror surface decorative sheet with more excellent specularity is obtained.

When the base sheet constituting the mirror surface decorative sheet of the present invention comprises a plurality of layers, the thickness of the entire base sheet may be 150 to 500 μm. When the base sheet constituting the mirror surface decorative sheet of the present invention comprises a plurality of layers, the hardness of the entire base sheet is preferably 700 to 2100 MPa. In particular, when the base sheet constituting the mirror surface decorative sheet of the present invention comprises a plurality of layers, and a base resin layer and a support resin layer are formed in this order from above (from the surface-protecting layer side), it is preferable that the base resin layer has a hardness of 700 to 1600 MPa, and that the support resin layer has a hardness of 400 to 1000 MPa. In this structure, a harder base resin layer is laminated on the surface-protecting layer side of the mirror surface decorative sheet, improving the hardness degree of the mirror surface decorative sheet, while a softer support resin layer is laminated on the side of an adherend or the like, accommodating irregularities of the adherend or the like, further improving the specularity of the mirror surface decorative sheet.

Surface-Protecting Layer

A surface-protecting layer is formed of a cured product of an ionizing radiation-curable resin composition, which imparts surface properties, such as weather resistance, stain resistance, scratch resistance, solvent resistance, and heat resistance, as well as excellent specularity, to the decorative sheet of the present invention.

The material of the surface-protecting layer is a cured product of an ionizing radiation-curable resin composition comprising an ionizing radiation-curable resin. The ionizing radiation-curable resin composition as used herein is a resin composition that is cured by ionizing radiation. Ionizing radiation refers to electromagnetic waves or charged particle radiation with an energy quantum that enables polymerization or crosslinking of molecules, such as ultraviolet rays (UV) and electron beams (EB). In addition to these, electromagnetic waves, such as X-rays and γ-rays, and charged particle radiation, such as α-rays and ionic rays, may also be used.

The ionizing radiation-curable resin contained in the ionizing radiation-curable resin composition may be suitably selected from polymerizable monomers and polymerizable oligomers (or prepolymers) that have been commonly used as an ionizing radiation-curable resin.

For example, polymerizable monomers, such as monofunctional (meth)acrylate and multifunctional (meth)acrylate; polymerizable oligomers, such as urethane (meth)acrylate oligomers, epoxy (meth)acrylate oligomers, polyester (meth)acrylate oligomers, polyether (meth)acrylate oligomers, and acrylic (meth)acrylate oligomers; and prepolymers may be used alone, or in a combination of two or more.

The ionizing radiation-curable resin used in the present invention is preferably a polymerizable oligomer, more preferably a multifunctional polymerizable oligomer having two or more functional groups, and still more preferably a multifunctional polymerizable oligomer having three or more functional groups.

To adjust the viscosity of the ionizing radiation-curable resin composition and to thereby improve the application properties, it is preferable to use a combination of a polymerizable oligomer and a polymerizable monomer at a mixture ratio (mass ratio) of preferably 2/8 to 8/2, and more preferably 4/6 to 6/4.

When an ultraviolet-curable resin is used as the ionizing radiation-curable resin, it is preferable to add a photopolymerization initiator in an amount of 0.1 to 5 parts by mass, per 100 parts by mass of the resin. The photopolymerization initiator is not particularly limited, and may be suitably selected from those that have been commonly used. Preferable examples include benzoin-based, acetophenone-based, phenylketone-based, benzophenone-based, anthraquinone-based photopolymerization initiators, and other photopolymerization initiators.

Examples of usable photosensitizers include p-dimethylbenzoic acid ester, tertiary amines, thiol-based sensitizers, and the like.

The ionizing radiation-curable resin used in the present invention is preferably an electron beam-curable resin. An electron beam-curable resin can be used without a solvent, and is further preferable from the viewpoint of environment or health. Further, the use thereof does not require a photopolymerization initiator, yet achieves stable curing properties and excellent surface properties.

The ionizing radiation-curable resin composition may contain various additives. Specifically, the ionizing radiation-curable resin composition may contain a filler (filler), such as an abrasion-resistant filler, a mat-formation filler, and a scratch-resistant filler, or may contain, to improve weather resistance, a weather-resistant agent, such as an ultraviolet absorber (UVA) and a hindered-amine light stabilizer (HALS). These weather-resistant agents are preferably reactive ultraviolet absorbers having one or more reactive functional groups containing an ethylenic double bond, such as a (meth)acryloyl group, a vinyl group, and an allyl group, or reactive light stabilizers (HALS), to prevent the weather-resistant agent from bleeding out and achieve stable weather resistance.

As various additives, the ionizing radiation-curable resin composition may appropriately contain an inorganic coloring pigment, such as titanium oxide, aluminum paste, and carbon black for the purpose of, for example, improving the concealing properties of the surface-protecting layer of the resulting decorative sheet, preventing the base material from yellowing, and improving the light resistance of the base material.

The surface-protecting layer has a thickness of 7 to 17 μm. When the thickness of the surface-protecting layer is less than 7 μm, excellent specularity and surface properties cannot be obtained. When the thickness exceeds 17 μm, excellent processability cannot be achieved.

To achieve excellent specularity, excellent surface properties, and excellent processability, the surface-protecting layer has a thickness of preferably 9 to 14 μm, and more preferably 10 to 13 μm.

Primer Layer

A primer layer is provided between the base sheet and the surface-protecting layer. To improve the adhesiveness of these layers and to improve specularity, the primer layer is preferably provided.

The primer layer is formed of, for example, a resin composition A containing a binder resin A and a matting agent A. Preferable examples of the binder resin A include, but are not particularly limited to, urethane resins, acrylic resins, polyester resins, vinyl chloride-vinyl acetate copolymers, chlorinated polypropylene resins, chlorinated polyethylene resins, and the like. It is preferable to use a two-component curable resin to achieve excellent adhesiveness and specularity.

The two-component curable resin is not particularly limited as long as its main compound is cured by crosslinking with the addition of a curing agent. It is preferable to use a two-component curable urethane resin in which the main compound is polyol (polyhydric alcohol), and the curing agent is an isocyanate curing agent.

Preferable examples of the main compound include polyols, such as polyethylene glycol, polypropylene glycol, butylene glycol, neopentyl glycol, and 1,6-hexanediol; acrylic polyols obtained by addition polymerization of (meth)acrylic acid esters, such as methyl (meth)acrylate, with monomers having a hydroxyl group, such as (meth) acrylic acid 2-hydroxyethyl, and (meth)acrylic acid 2-hydroxypropyl; polyester polyols obtained by a polycondensation reaction of known diols, e.g., glycols, such as ethylene glycol and propylene glycol, with at least one member selected from, for example, dibasic acids, such as adipic acid, maleic acid, phthalic acid, and terephthalic acid, and acid esters thereof; polyols having hydroxyl groups as functional groups of, for example, polyether polyols obtained by addition polymerization of the diols mentioned above with, for example, ethylene oxide, propylene oxide, and tetrahydrofuran; and the like. These may be used alone, or in a combination of two or more.

As the isocyanate curing agent, a compound that has been known may be appropriately used. Examples include aromatic isocyanates, such as 2,4-tolylene diisocyanate (TDI), xylene diisocyanate (XDI), naphthalene diisocyanate, and 4,4'-diphenylmethane diisocyanate; and polyisocyanates, such as aliphatic (or alicyclic) isocyanates, such as 1,6-hexamethylene diisocyanate (HMDI), isophorone diisocyanate (IPDI), methylene diisocyanate (MDI), hydrogenated tolylene diisocyanate, and hydrogenated diphenylmethane diisocyanate. It is also possible to use adducts or polymers of these various isocyanates, such as an adduct of tolylene diisocyanate and tolylene diisocyanate trimer.

The primer layer preferably contains a matting agent to improve specularity. Preferable examples of the matting agent include inorganic particles, such as alumina, silica, kaolinite, iron oxide, diamond, and silicon carbide; and organic particles, such as acrylic resin, urethane resin, nylon resin, polypropylene resin, and urea-based resin. These may be used alone, or in a combination of two or more.

The shape of the matting agent is not particularly limited, and may be in the form of a sphere, an ellipse, a polyhedron, a scale, or the like. The matting agent is preferably in the form of a sphere to obtain specularity.

The matting agent has an average particle diameter of preferably 0.5 to 8 μm, and more preferably 1 to 5 μm. When the average particle diameter is within this range, excellent specularity is obtained. The average particle diameter as used herein is a particle diameter based on volume, measured by a laser-diffraction or laser-scattering particle size distribution analyzer.

The matting agent is preferably contained in an amount of preferably 0.5 to 20 parts by mass, more preferably 1 to 15 parts by mass, and still more preferably 3 to 10 parts by mass, per 100 parts by mass of the binder resin. When the amount is within this range, excellent adhesiveness and specularity are obtained.

The primer layer has a thickness of usually about 0.5 to 20 μm, and preferably 1 to 10 μm. When the thickness of the primer layer thickness is within this range, excellent adhesiveness and specularity are obtained.

Rear Primer Layer

Figure 4:
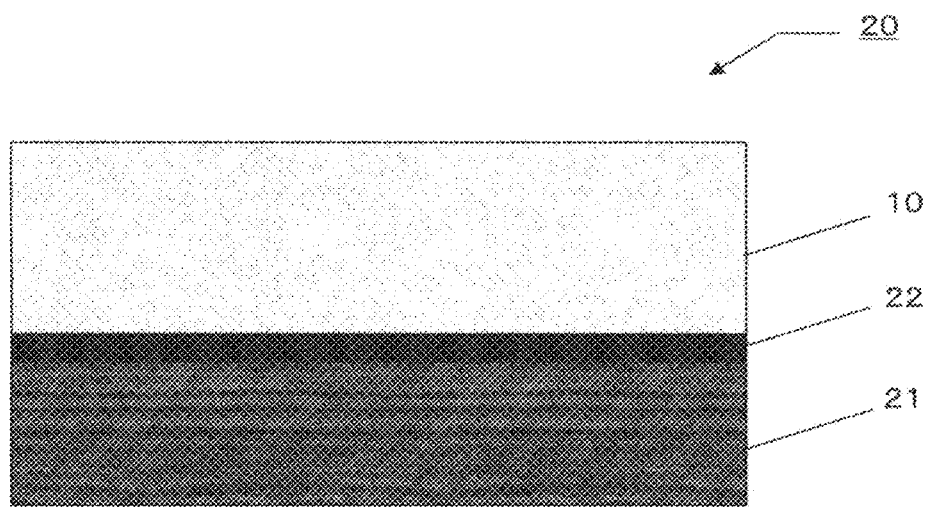
FIG. 4 is a schematic diagram showing a cross section of one embodiment of a mirror surface decorative plate according to the present invention.

A rear primer layer is provided to improve the adhesiveness between the base sheet and various adherends, such as a base plate as shown in FIG. 4, and is provided on a side of the base sheet opposite to that comprising the surface-protecting layer.

The rear primer layer is formed of, for example, a resin composition B containing a binder resin B and a matting agent B. The binder resin B is preferably those mentioned above in relation to the binder resin A, and is appropriately selected based on, for example, the quality of the material of the adherend.

The matting agent B is preferably those mentioned above in relation to the matting agent A. The average particle diameter and the amount are also as stated above.

The rear primer layer has a thickness of preferably about 1 to 5 μm, and more preferably 1 to 3 μm. When the thickness is within this range, excellent adhesiveness is achieved between the base sheet and various adherends.

Ornamental Layer

An ornamental layer imparts decoration to the mirror surface decorative sheet, and may be a uniformly colored concealing layer (solid printing layer), a picture layer obtained by printing various patterns using inks and a printer, or a combination of a concealing layer and a picture layer. The ornamental layer is usually provided between the base sheet and the surface-protecting layer, or between the base sheet and the primer layer, which is preferably provided.

The concealing layer conceals the surface of an adherend. When a colored or unevenly colored base sheet is used, the concealing layer adjusts the surface color by giving an intended color.

The picture layer imparts a pattern to the decorative sheet, such as wood grain patterns, stone grain patterns imitating a rock surface, such as marble patterns (for example, a travertine marble pattern), textile patterns imitating a cloth grain or a cloth-like pattern, tile patterns, brick patterns, or combinations of these patterns, such as marquetry or patchwork. These patterns are formed by multicolor printing using general process colors, i.e., yellow, red, blue, and black; or by multicolor printing with spot colors that is performed by using plates for the respective colors constituting the pattern.

Examples of ink compositions usable in the ornamental layer include those obtained by appropriately mixing a binder resin with a colorant, such as a pigment and a dye, an extender pigment, a solvent, a stabilizer, a plasticizer, a catalyst, a curing agent, and the like. Preferable examples of the binder resin include, but are not particularly limited to, urethane resins, vinyl chloride/vinyl acetate copolymer resins, vinyl chloride/vinyl acetate/acrylic copolymer resins, chlorinated polypropylene resins, acrylic resins, polyester resins, polyamide resins, butyral resins, polystyrene resins, cellulose nitrate resins, cellulose acetate resins, and the like, with polyurethane resins being more preferable. As the binder resin, resins arbitrarily selected from these resins may be used alone, or in a combination of two or more.

Preferable examples of the colorant include those exemplified above as colorants used for the base sheet.

The ornamental layer has a thickness of usually about 0.5 to 20 μm, and preferably 1 to 10 μm. When the thickness of the ornamental layer is within this range, excellent designability is given to the decorative sheet, as well as concealing properties.

Masking Film

A masking film is preferably provided on the surface-protecting layer of the mirror surface decorative sheet to prevent scratches from occurring during the processing steps of the mirror surface decorative sheet with respect to an adherend, such as a base plate, and during transportation or installation of the decorative plate obtained through the processing steps.

The masking film usually comprises a masking film base material and a pressure sensitive adhesive layer.

Preferable examples of the masking film base material include polyester films, such as polyethylene terephthalate (PET) films, polyolefin films, such as polyethylene films and polypropylene films, polycarbonate films, and the like.

The thickness of the masking film base material is not particularly limited, and is preferably 10 to 100 μm, and more preferably 30 to 70 μm. When the thickness is within this range, excellent scratch resistance is obtained, curling or detachment do not easily occur during the processing steps, and the costs are reduced.

The pressure sensitive adhesive for forming the pressure sensitive adhesive layer is preferably, for example, an acrylic-based pressure sensitive adhesive mainly comprising a (meth)acrylic acid ester-based polymer, or may be a rubber-based pressure sensitive adhesive, a silicone-based pressure sensitive adhesive, or the like, so that detachment hardly occurs during storage, detachment easily occurs at the time of use, and pressure sensitive adhesive residue does not easily remain.

The pressure sensitive adhesive layer has a thickness of preferably 5 to 40 μm, and more preferably 10 to 30 μm. When the thickness is within this range, detachment does not easily occur during storage, detachment easily occurs at the time of use, and pressure sensitive adhesive residue does not easily remain.

Properties of Mirror Surface Decorative Sheet

The mirror surface decorative sheet of the present invention has a color difference (ΔE) of less than 1.2, and further less than 0.5 in accordance with the following evaluation. The mirror surface decorative sheet of the present invention has such a color difference, as well as excellent concealing properties, and is not easily affected by a base plate; for this reason, excellent specularity is achieved. The color difference (ΔE) as used herein is ΔE calculated using the following formula. Specifically, a test sample is taken from the center of the mirror surface decorative sheet, and the L*, a*, and b* in the CIE (International Commission on Illumination) L*a*b* color space specified in JIS Z 8729-1994 are measured at two points, i.e., one is in the black portion while the other is in the white portion of a contrast ratio test paper (JIS K 5400 7.2(2)(f)) used as a base layer, using a spectrocolorimeter under viewing conditions of D65 light source at 10 degrees. Then, the L*, a*, and b* differences between these two points are respectively considered to be ΔL*, Δa*, and Δb* for use in the following formula. The smaller the ΔE value, the higher the concealing properties, indicating more excellent specularity.

$$\text{Color difference } \Delta E = ((\Delta L^*)^2 + (\Delta a^*)^2 + (\Delta b^*)^2)^{1/2}$$

The mirror surface decorative sheet of the present invention has excellent specularity as represented by a DOI value, measured according to ASTM D5767, of 80% or more, and further 90% or more. The DOI value as used herein represents distinctness of an image reflected on the surface of the decorative sheet, and serves as an index of influence of surface-micro irregularities on the specularity. The DOI value may be measured by using, for example, a distinctiveness of image (DOI) meter.

Method for Producing a Mirror Surface Decorative Sheet

It is preferable to produce the mirror surface decorative sheet of the present invention by sequentially performing the following steps:

step (1) of forming a base sheet;

step (2) of forming a primer layer and/or a rear primer layer on the base sheet; and step (3) of applying an ionizing radiation-curable resin composition to the base sheet or the primer layer, and allowing the composition to be cured by crosslinking to form a surface-protecting layer.

Step (1) is a step of forming a base sheet.

The base sheet is obtained by using a resin composition obtained by optionally adding a colorant and other additives to a resin material, and forming the resin composition into a sheet by using a process, such as calendering, blown film extrusion, or T-die extrusion. Here, biaxial stretching may be performed, if necessary.

To improve the adhesiveness with a layer in contact with the base sheet, an easy adhesion layer may be provided by optionally subjecting the surface of the obtained base sheet to a physical or chemical surface treatment, i.e., an oxidation method, such as corona discharge treatment, chromium oxidation treatment, flame treatment, hot-air treatment, or ozone and ultraviolet treatment, or an irregularity-forming method, such as sandblasting or solvent treatment.

Step (2) is a step of forming a primer layer and/or a rear primer layer on the base sheet, and is a preferably performed step. The primer layer and rear primer layer may be formed by applying resin compositions A and B, which respectively form these layers by a known coating method, such as gravure printing, bar coating, roll coating, reverse roll coating, or comma coating. When both the primer layer and rear primer layer are provided, any of these layers may be first formed.

Step (3) is a step of applying an ionizing radiation-curable resin composition to the base sheet or preferably to the primer layer, which is preferably provided on the base sheet, and allowing the composition to be cured by crosslinking to form a surface-protecting layer.

The application of the ionizing radiation-curable resin composition is performed on the surface of the base sheet or the optionally provided primer layer to a thickness after curing of 7 to 15 μm by a known method, such as gravure printing, bar coating, roll coating, reverse roll coating, or comma coating, with gravure printing being preferable. The viscosity of the ionizing radiation-curable resin composition is not particularly limited as long as an uncured resin layer of the ionizing radiation-curable resin composition is formed on the surface of the base sheet or the primer layer.

Subsequently, the uncured resin layer formed by applying the ionizing radiation-curable resin composition is irradiated with an ionizing radiation, such as an electron beam or ultraviolet ray, to cure the uncured resin layer. In this manner, a surface-protecting layer, which is a cured product of the ionizing radiation-curable resin composition, is formed.

When an electron beam is used for ionizing radiation, its accelerating voltage may be suitably selected according to the resin used or the thickness of the layer. Generally, it is preferable to cure the uncured resin layer at an accelerating voltage of about 70 to 300 kV.

In electron beam radiation, a higher accelerating voltage increases the penetrating ability to a greater extent. Therefore, when a material that is subject to deterioration by an electron beam is used for the base material layer, the accelerating voltage is adjusted to make the electron beam penetration depth equal to the thickness of the resin layer. This makes it possible to avoid irradiation of the base sheet with excessive electron beam, minimizing the deterioration of the base material layer by excessive electron beam.

The amount of radiation is preferably such that the crosslinking density of the resin layer is saturated, and is usually 5 to 300 kGy (0.5 to 30 Mrad), preferably 10 to 100 kGy (1 to 10 Mrad), and still more preferably 30 to 70 kGy (3 to 7 Mrad).

There is no particular limitation to the electron beam sources, and various types of electron beam accelerators, such as Cockcroft-Walton accelerators, Van de Graaff accelerators, resonant transformer-type accelerators, insulated core transformer-type accelerators, linear accelerators, Dynamitron accelerators, or high frequency-type accelerators, may be used.

When ultraviolet rays are used for ionizing radiation, an ultraviolet ray having a wavelength of 190 to 380 nm is used. Examples of usable ultraviolet ray sources include, but are not limited to, high-pressure mercury lamps, low-pressure mercury lamps, metal halide lamps, carbon arc lamps, and the like.

When the base sheet constituting the mirror surface decorative sheet of the present invention comprises a plurality of layers such that the base resin layer and the support resin layer are formed in this order from the above (from the surface-protecting layer side), the production may be performed, for example, by sequentially performing the following steps:

step (1a) of laminating a support resin layer to a base resin layer, thereby obtaining a base sheet; and step (2a) of applying an ionizing radiation-curable resin composition to a surface at the base resin layer side of the base sheet, and allowing the composition to be cured by crosslinking to form a surface-protecting layer; or step (1b) of applying an ionizing radiation-curable resin composition to one of the surfaces of a base resin layer, and allowing the composition to be cured by crosslinking to form a surface-protecting layer; and step (2b) of laminating the base resin layer to a support resin layer, thereby obtaining a base sheet.

Step (1a) is a step of laminating a support resin layer to a base resin layer, thereby obtaining a base sheet.

The base sheet is obtained in the following manner. First, any of a support resin layer or a base resin layer is formed. A base resin layer, for example, is obtained by using a resin composition obtained by optionally adding a colorant and other additives to a resin material for forming the base resin layer, and forming the resin composition into a sheet by using a process, such as calendering, blown film extrusion, or T-die extrusion. Here, biaxial stretching may be performed, if necessary.

Subsequently, the surface of the obtained base resin layer is optionally subjected to corona discharge treatment or the like to form an easy adhesion layer, and on this base resin layer, an ornamental layer formed of a concealing layer and/or a picture layer is formed. Then, an adhesive is applied as required, and a support resin layer is then bonded or pressure-bonded by extrusion lamination, dry lamination, wet lamination, thermal lamination, or the like. In this manner, a base sheet is obtained. When provided, a rear primer layer may be formed by applying a resin composition for forming the rear primer layer to a surface of the base resin layer opposite to that comprising the ornamental layer etc. by a known coating method before or after the lamination of the support resin layer.

Step (2a) is a step of applying an ionizing radiation-curable resin composition to a surface at the base resin layer side of the base sheet, and allowing the composition to be cured by crosslinking to form a surface-protecting layer. The surface-protecting layer may be obtained by applying the above ionizing radiation-curable resin composition containing the ionizing radiation-curable resin to the base resin layer or to the optionally provided primer layer, and allowing the composition to be cured by crosslinking.

The application of the ionizing radiation-curable resin composition is performed on the surface of the optionally provided primer layer to a thickness after curing of 2 to 15 μm by a known method, such as gravure printing, bar coating, roll coating, reverse roll coating, or comma coating, with gravure printing being preferable. The viscosity of the ionizing radiation-curable resin composition is not particularly limited as long as an uncured resin layer is formed on the surface of the base resin layer or primer layer.

Subsequently, the uncured resin layer formed by applying the ionizing radiation-curable resin composition is irradiated with an ionizing radiation, such as an electron beam or ultraviolet ray, to cure the uncured resin layer. In this manner, a surface-protecting layer, which is a cured product of the ionizing radiation-curable resin composition, is formed.

When an electron beam is used for ionizing radiation, its accelerating voltage may be suitably selected according to the resin used or the thickness of the layer. Generally, it is preferable to cure the uncured resin layer at an accelerating voltage of about 70 to 300 kV.

In electron beam radiation, a higher accelerating voltage increases the penetrating ability to a greater extent. Therefore, when a material that is subject to deterioration by an electron beam is used for the base sheet, the accelerating voltage is adjusted to make the electron beam penetration depth equal to the thickness of the resin layer. This makes it possible to avoid irradiation of base sheet with excessive electron beam, minimizing the deterioration of the base sheet by excessive electron beam.

The amount of radiation is such that the crosslinking density of the resin layer is saturated, and is usually 5 to 300 kGy (0.5 to 30 Mrad), preferably 10 to 100 kGy (1 to 10 Mrad), and still more preferably 30 to 70 kGy (3 to 7 Mrad).

There is no particular limitation to the electron beam sources, and various types of electron beam accelerators, such as Cockcroft-Walton accelerators, Van de Graaff accelerators, resonant transformer-type accelerators, insulated core transformer-type accelerators, linear accelerators, Dynamitron accelerators, or high frequency-type accelerators, may be used.

When ultraviolet rays are used for ionizing radiation, an ultraviolet ray having a wavelength of 190 to 380 nm is used. Examples of usable ultraviolet ray sources include, but are not limited to, high-pressure mercury lamps, low-pressure mercury lamps, metal halide lamps, carbon arc lamps, and the like.

The primer layer may be formed by applying a resin composition for forming the primer layer by a known coating method, such as gravure printing, bar coating, roll coating, reverse roll coating, or comma coating.

The mirror surface decorative sheet of the present invention may also be produced by performing step (1a) and step (2a) in reverse, i.e., by sequentially performing step (1b) of applying an ionizing radiation-curable resin composition to one of the surfaces of the base resin layer, and allowing the composition to be cured by crosslinking to form a surface-protecting layer; and step (2b) of laminating the base resin layer to a support resin layer, thereby obtaining a base sheet. More specifically, it is possible to produce the mirror surface decorative sheet of the present invention by first forming a surface-protecting layer, followed by lamination of a base resin layer to a support resin layer.

The thus-obtained mirror surface decorative sheet of the present invention has excellent specularity, and excellent processability in which neither springback nor cracking occurs during the processing steps, as well as excellent surface properties. With such characteristics, the mirror surface decorative sheet of the present invention is bonded to an adherend, such as a base plate, and suitably used as a mirror surface decorative plate for architectural interior and exterior materials, building materials, furniture, and various components for home appliances, etc., in particular, kitchen products, and interior materials, such as bathroom shelves and bathroom doors.

Mirror Surface Decorative Plate

The mirror surface decorative plate of the present invention comprises a base plate, an adhesive layer, and the mirror surface decorative sheet of the present invention in this order. The decorative plate of the present invention is described with reference to FIG. 4.

FIG. 4 is a schematic diagram showing a cross section of a preferable embodiment of a mirror surface decorative plate according to the present invention. The mirror surface decorative plate 20 shown in FIG. 4 comprises a base plate 21, an adhesive layer 22, and a mirror surface decorative sheet 10 in this order.

The base plate used in the mirror surface decorative plate of the present invention is not particularly limited, and a wood-based plate, such as wood, a plastic film, a plastic sheet, a metal plate, a ceramic material, or the like may be suitably used according to the usage.

Examples of wood-based plates include sliced veneers, wooden single plates, wooden plyboards, particleboards, medium-density fiberboards (MDF), and like wood materials formed from various materials, such as Japanese cedar, Japanese cypress, zelkova, pine, lauan, teak, and melapi. These wood-based plates may be used alone, or in the form of a laminate of any two or more thereof. The wood-based plates encompass not only wood-based plates, but also paper powder-containing plastic plates and reinforced high-strength papers.

The plastic films and plastic sheets may be made of various synthetic resins. Examples of synthetic resins include polyolefin resins, vinyl-based resins, polyester resins, acrylic resins, polyamide resins, cellulose-based resins, polystyrene resins, polycarbonate resins, polyarylate resins, polyimide resins, and the like.

When a plastic film or a plastic sheet is used as the base plate, one or both of the surfaces may be subjected to, in order to improve the adhesiveness with the decorative sheet, a physical or chemical surface treatment, i.e., an oxidation method, such as corona discharge treatment, chromium oxidation treatment, flame treatment, hot-air treatment, or ozone and ultraviolet treatment, or an irregularity-forming method, such as sandblasting or solvent treatment.

Examples of metal plates include metal materials, such as iron, aluminum, stainless steel, and copper. These may be subjected to a surface treatment, such as molten zinc plating or electrolytic zinc plating. To impart concealing properties, the metal plate may be colored directly to provide a coating layer.

Examples of ceramic materials include ceramic-based building materials such as gypsum boards, calcium silicate boards and wood chip cement boards, pottery, glass, porcelain enamels, baked tiles, and plates made of volcanic ash as a main raw material. In addition to these, there may also be used composite plates of various materials such as a fiber-reinforced plastic (FRP) plate, a plate produced by attaching an iron plate onto both surfaces of a paper honeycomb, and a polyethylene resin plate sandwiched between two aluminum plates.

The adhesive for the adhesive layer used for bonding the base plate to the mirror surface decorative sheet is not particularly limited, and a heat-sensitive adhesive, pressure-sensitive adhesive, or the like may be used. The resin used in the adhesive constituting the adhesive layer may be at least one resin selected from acrylic resins, vinyl chloride-based resins, vinyl acetate-based resins, vinyl chloride-vinyl acetate based copolymer resins, styrene-acrylic-based copolymer resins, polyester resins, polyamide-based resins, and the like. Further, a two-component curable polyurethane-based adhesive or polyester-based adhesive using an isocyanate etc. as a curing agent may also be applied. Of these, a thermoplastic resin adhesive is preferable because it functions as a cushion layer and achieves an effect, i.e., it prevents the surface-protecting layer from cracking during the processing steps under severe conditions in which a metal plate is used as the base plate.

A pressure sensitive adhesive may also be used to form the adhesive layer. The pressure sensitive adhesive may be appropriately selected from acrylic-based pressure sensitive adhesives, urethane-based pressure sensitive adhesives, silicone-based pressure sensitive adhesives, and rubber-based pressure sensitive adhesives.

The adhesive layer may be formed by applying the above resin in an applicable form, such as a solution-form or an emulsion-form, by gravure printing, screen printing, reverse coating using a photogravure plate, or the like, and then drying the resin.

The thickness of the adhesive layer is not particularly limited, and is usually about 1 to 100 μm. With this thickness, excellent adhesiveness is obtained, and an effect is achieved, i.e., the occurrence of cracking in the surface-protecting layer is reduced.

EXAMPLES

The present invention is described in detail below with reference to Examples. However, the present invention is not limited to these Examples.
Evaluation Method
1. Evaluation of Specularity (Evaluation by Visual Observation)

The decorative sheets and decorative plates obtained in the Examples and the Comparative Examples were evaluated under a fluorescent lamp (linear), based on the following criteria, by visually observing an image of the fluorescent lamp reflected on the surface of the decorative sheet:
A: The image of the fluorescent lamp was observed almost as a straight line.
B: Although a small degree of undulation of the image of the fluorescent lamp was observed, it was practically satisfactory.
C: A considerable degree of undulation of the image of the fluorescent lamp was observed.
2. Evaluation of Concealing Properties The color difference (ΔE) was calculated with respect to the mirror surface decorative sheets obtained in the Examples and Comparative Examples, using the following formula. Specifically, the L*, a*, and b* in the CIE (International Commission on Illumination) L*a*b* color space specified in JIS Z 8729-1994 were measured at two points, i.e., one was in the black portion while the other was in the white portion of a contrast ratio test paper (JIS K 5400 7.2(2)(f)) used as a base layer, using a spectrocolorimeter under viewing conditions of D65 light source at 10 degrees. Then, the L*, a*, and b* differences between these two points were respectively considered to be ΔL*, Δa*, and Δb* for use in the following formula. The smaller the ΔE value, the higher the concealing properties, indicating more excellent specularity.

$$\text{Color difference } \Delta E = ((\Delta L^*)^2 + (\Delta a^*)^2 + (\Delta b^*)^2)^{1/2}$$

A: The color difference ΔE was less than 0.5.
B: The color difference ΔE was 0.5 or more and less than 1.2.
C: The color difference ΔE was 1.2 or more.
3. Evaluation of Processability (Evaluation of 2R Bending)

According to the V-block method of the metallic material bend test specified in JIS Z 2248, test pieces (40×40 mm) obtained by cutting the decorative sheets of the Examples and the Comparative Examples were gradually bent using a push metal component having a 2R bending portion. Thereafter, the bent portion was colored with a whiteboard marker, and wiped off with cloth. The state after wiping was visually observed and evaluated based on the following criteria.

A: The coloring with a whiteboard marker was almost wiped off, and almost no cracking was observed.
B: Although a small portion colored with a whiteboard marker remained, and minor cracking and whitening were observed, it was practically satisfactory.
C: The portion colored with a whiteboard marker could not be wiped off, and significant cracking and whitening were observed.
4. Evaluation of Processability (Evaluation of Springback)

A polyurethane-based hot-melt adhesive ("Haibon 4836" (product No.) produced by Hitachi Chemical Polymer Co., Ltd.) that had been melted at a temperature of 115° C. using a melting device ("MC-12" (model No.), produced by Nordson Corporation) was applied to MDF (thickness: 3 mm, based on JIS A 5905: 2003) having a shape of 3R to a thickness of 80 μm to form an adhesive layer. Subsequently, wrapping was performed by bonding the base material of the decorative sheets obtained in the Examples and the Comparative Examples supplied by a profile laminator PL-300-PUR (a PUR wrapping machine, produced by Marunaka Tekkosho Inc.) to the MDF via the adhesive layer. The state of detachment (springback) at the end portion of the decorative sheet was visually observed and evaluated based on the following criteria.
A: Almost no detachment was observed.
B: Although slight detachment was observed at the end portion, it was practically satisfactory.
C: A considerable degree of detachment was observed at the end portion.
5. Evaluation of Heat Resistance (Dry Heat Test)

An aluminum jig (diameter: 10 cm, cylindrical shape, weight: 700 g) heated to 75° C. was placed on the decorative sheets obtained in the Examples and the Comparative Examples, and left to stand for 20 minutes. Thereafter, the appearance of the portion on which the jig was placed was visually observed and evaluated according to the following criteria.
A: Almost no change in appearance was observed.
B: Although a slight change in appearance was observed, it was practically satisfactory.
C: A considerable degree of change in appearance was observed.
6. Evaluation of Scratch Resistance Steel wool (#0000) was abuttingly placed on the decorative sheets obtained in the Examples and the Comparative Examples, and rubbed 5 strokes at a load of 1.5 kg. The surface of the decorative sheets was then visually observed and evaluated based on the following criteria.
A: Almost no change in appearance was observed.
B: Although a slight change in appearance was observed, it was practically satisfactory.
C: A considerable degree of change in appearance was observed.
7. Evaluation of Blocking Property (after the Formation of a Primer Layer)

The sheets of the Examples and the Comparative Examples when the primer layer was formed were confirmed by touch for dryness according to JIS K 5600 1-1, and evaluated based on the following criteria.
A: Dried in 30 seconds after the application of the resin composition for forming the primer layer (no finger mark remained).
B: Dried in one minute after the application of the resin composition for forming the primer layer (no finger mark remained).

C: Did not dry even after one minute after the application of the resin composition for forming the primer layer (a finger mark remained).

8. Evaluation of Blocking Property (after the Formation of Surface-Protecting Layer)

Two test sample sheets each (50 mm×50 mm) were prepared by cutting the sheets in the Examples and the Comparative Examples when the surface-protecting layers were formed. The two test sample sheets each were laminated to each other so that the surface-protecting layer side of one of the sheets was brought into contact with the rear primer layer side of the other sheet, and sandwiched using a blocking tester. Thereafter, the compression handle was tightened to apply a pressure of 1 kg/cm$^2$. Subsequently, the resulting product was placed in an oven at 40° C. for 24 hours, together with the blocking tester, and then removed therefrom, followed by air-cooling. The two laminated test sample sheets were detached from each other, and the sound and feeling at this time were evaluated based on the following criteria.

A: No sound and no feeling upon detachment.
B: Slight sound and slight feeling upon detachment.
C: A big sound and great feeling upon detachment.

Example 1

A colored polypropylene resin sheet ("Artply" (trade name), produced by Mitsubishi Plastics, Inc., thickness: 250 μm) was prepared as a base sheet. Then, a polyester resin composition (a two-component heat-curable resin composition type, a resin composition obtained by adding 6 parts by mass of a matting agent having an average particle diameter of 4 μm, per 100 parts by mass of the resin component) was applied to one of the surfaces of this sheet to form a primer layer (thickness: 2 μm), and a polyester-urethane resin composition was applied to the other surface to form a rear primer layer (thickness: 2 μm).

Subsequently, an ionizing radiation-curable resin composition (a mixture of a urethane acrylate oligomer (the number of functional groups: 3) with a monomer) was applied in an amount of 10 g/m$^2$ on the primer layer by gravure printing to form a coating film. Thereafter, this coating film was irradiated with an electron beam at 175 keV and 5 Mrad (50 kGy) to be cured by crosslinking to form a surface-protecting layer (thickness: 10 μm). In this manner, a mirror surface decorative sheet was obtained. Further, a masking film was laminated on the surface-protecting layer side in such a manner that the pressure sensitive adhesive layer (an acrylic resin-based pressure sensitive adhesive, thickness: 10 μm) of a polyethylene film (thickness: 50 μm) faced the surface-protecting layer.

Then, an ethylene-vinyl acetate-based adhesive (aqueous emulsion type, "BA-20" (trade name), produced by Chuorika Co., Ltd.) was applied to the surface at the rear primer layer side of the obtained mirror surface decorative sheet to form an adhesive layer (thickness: 7 μm), which was bonded to a medium-density wood fiberboard (MDF, thickness: 2.7 mm) to obtain a mirror surface decorative plate.

The obtained decorative sheet and decorative plate were evaluated as described above. Table 1 shows the evaluation results.

Examples 2 to 17 and 20

Decorative sheets and decorative plates were obtained as in Example 1, except that the thickness and the ten-point mean roughness (Rzjis) of the base sheet, the average particle diameter and the amount of the matting agent, the thickness of the surface-protecting layer, the resin curing method, and the crack elongation were changed as shown in Table 1. The obtained decorative sheets and decorative plates were evaluated as described above. Table 1 shows the evaluation results.

Example 18

A colored polypropylene resin sheet ("Artply" (trade name) produced by Mitsubishi Plastics, Inc., thickness: 150 μm) was prepared as a base resin layer. Then, an ornamental layer with a wood grain pattern (thickness: 5 μm) was applied to one of the surfaces while a polyester resin composition (a two-component heat-curing resin type) was applied to the other surface to form a primer layer (thickness: 2 μm). Thereafter, a polypropylene resin sheet (thickness: 100 μm) was laminated by T-die extrusion as a support resin layer on the ornamental layer side to obtain a base sheet having an ornamental layer and a primer layer, and a polyester-urethane resin composition was applied to the surface of the support resin layer side of the base sheet to form a rear primer layer (thickness: 2 μm). The base resin layer had a hardness of 1200 MPa, and the support resin layer had a hardness of 600 MPa.

Subsequently, an ionizing radiation-curable resin composition (a mixture of a urethane acrylate oligomer (the number of functional groups: 3) with a monomer) was applied in an amount of 7 g/m$^2$ on the primer layer by gravure printing to form a coating film. Thereafter, this coating film was irradiated with an electron beam at 175 keV and 5 Mrad (50 kGy) to be cured by crosslinking to form a surface-protecting layer (thickness: 7 μm). In this manner, a mirror surface decorative sheet was obtained. Further, a masking film was laminated on the surface-protecting layer side in such a manner that the pressure sensitive adhesive layer (an acrylic resin-based pressure sensitive adhesive, thickness: 10 μm) of a polyethylene film (thickness: 50 μm) faced the surface-protecting layer.

Then, an ethylene-vinyl acetate-based adhesive (aqueous emulsion type, "BA-20" (trade name), produced by Chuorika Co., Ltd.) was applied to the surface at the rear primer layer side of the obtained mirror surface decorative sheet to form an adhesive layer (thickness: 7 μm), which was bonded to a medium-density wood fiberboard (MDF, thickness: 2.7 mm) to obtain a mirror surface decorative plate.

The obtained mirror surface decorative sheet and mirror surface decorative plate were evaluated as described above. Table 1 shows the evaluation results.

Example 19

A mirror surface decorative sheet and a mirror surface decorative plate were obtained as in Example 1, except that the thickness and hardness of the support resin layer and the base resin layer, the thickness of the base material layer, and the thickness of the surface-protecting layer of Example 18 were changed as shown in Table 1. The base resin layer had a hardness of 1500 MPa, and the support resin layer had a hardness of 900 MPa.

The obtained mirror surface decorative sheet and mirror surface decorative plate were evaluated as described above. Table 1 shows the evaluation results.

TABLE 1

| | | | Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Base material | Resin | Base material layer | PP | PP | PP | PP | PP | PP | PP | PP | PP | PP | PP | PP | PP |
| | | Support resin layer | — | — | — | — | — | — | — | — | — | — | — | — | — |
| | | Base material total thickness (μm) | 250 | 200 | 400 | 150 | 500 | 250 | 250 | 250 | 250 | 250 | 250 | 250 | 250 |
| | | Rzjis (μm) | 4 | 4 | 4 | 4 | 4 | 2 | 5 | 4 | 4 | 4 | 4 | 4 | 4 |
| Primer layer | Average particle diameter (μm) | | 3 | 3 | 3 | 3 | 3 | 3 | 3 | 0.8 | 6 | 3 | 3 | 3 | 3 |
| Matting agent | Amount (parts by mass) | | 6 | 6 | 6 | 6 | 6 | 6 | 6 | 6 | 6 | 1 | 15 | 6 | 6 |
| | Thickness of surface-protecting layer (μm) | | 10 | 10 | 10 | 10 | 10 | 10 | 10 | 10 | 10 | 10 | 10 | 8 | 15 |
| | Resin curing method | | EB | EB | EB | EB | EB | EB | EB | EB | EB | EB | EB | EB | EB |
| | Crack elongation (%) | | 15 | 15 | 15 | 15 | 15 | 15 | 15 | 15 | 15 | 15 | 15 | 17 | 10 |
| Evaluation | Specularity (sheet) (visual observation) | | A | A | A | A | A | A | B | A | B | A | B | B | A |
| | Specularity (decorative plate) (visual observation) | | A | A | A | B | A | A | B | A | B | A | B | B | A |
| | Concealing properties | | A | B | A | B | A | A | A | A | A | A | A | A | A |
| | Processability (2R bending) | | A | A | A | A | A | A | A | A | A | A | A | A | B |
| | Processability (springback) | | A | A | B | A | B | A | A | A | A | A | A | A | B |
| | Heat resistance | | A | A | A | A | A | A | A | A | A | A | A | A | A |
| | Scratch resistance | | A | A | A | A | A | A | A | A | A | A | A | A | A |
| | Blocking property (after primer layer formation) | | A | A | A | A | A | A | A | B | A | B | A | A | A |
| | Blocking property (after surface-protecting layer formation) | | A | A | A | A | A | A | A | B | A | B | A | A | B |

| | | | Examples | | | | | | |
|---|---|---|---|---|---|---|---|---|---|
| | | | 14 | 15 | 16 | 17 | 18 | 19 | 20 |
| Base material | Resin | Base material layer | PP | PP | PP | PP | PP 150 μm | PP 250 μm | PP |
| | | Support resin layer | — | — | — | — | PP 100 μm | PP 150 μm | — |
| | | Base material total thickness (μm) | 250 | 250 | 250 | 250 | 250 | 400 | 250 |
| | | Rzjis (μm) | 4 | 4 | 4 | 4 | 4 | 4 | 4 |
| Primer layer | Average particle diameter (μm) | | 3 | 3 | 3 | 3 | 3 | 3 | 3 |
| Matting agent | Amount (parts by mass) | | 6 | 6 | 6 | 6 | 6 | 6 | 6 |
| | Thickness of surface-protecting layer (μm) | | 7 | 17 | 10 | 10 | 10 | 10 | 10 |
| | Resin curing method | | EB | EB | EB | EB | EB | EB | UV |
| | Crack elongation (%) | | 15 | 15 | 17 | 10 | 15 | 15 | 15 |
| Evaluation | Specularity (sheet) (visual observation) | | B | A | A | A | A | A | A |
| | Specularity (decorative plate) (visual observation) | | B | A | A | A | A | A | A |
| | Concealing properties | | A | A | A | A | A | A | A |
| | Processability (2R bending) | | B | A | A | B | A | A | A |
| | Processability (springback) | | A | B | A | A | A | B | A |
| | Heat resistance | | A | A | A | A | A | A | A |
| | Scratch resistance | | A | B | B | A | A | A | A |
| | Blocking property (after primer layer formation) | | A | A | A | A | A | A | A |
| | Blocking property (after surface-protecting layer formation) | | A | B | A | A | A | A | A |

PP: Colored polypropylene resin sheet

Comparative Example 1

The decorative sheet and decorative plate of Comparative Example 1 were obtained as in Example 1, except that an amorphous polyethylene terephthalate resin seat (thickness: 250 μm, PET-G) was used as the base sheet. The obtained decorative sheet and decorative plate were evaluated as described above. Table 2 shows the evaluation results.

Comparative Examples 2 to 10

Decorative sheets and decorative plates were obtained as in Example 1, except that the type, the thickness, and the ten-point mean roughness (Rzjis) of the base sheet, the average particle diameter and the amount of the matting agent, the thickness of the surface-protecting layer, and the crack elongation were changed as shown in Table 2. The obtained decorative sheets and decorative plates were evaluated as described above. Table 2 shows the evaluation results.

Comparative Example 11

A mirror surface decorative sheet and mirror surface decorative plate were obtained as in Example 1, except that the resin composition for forming the surface-protecting layer was changed, and a surface-protecting layer was formed by using a resin composition containing 100 parts by mass of urethane resin as the main compound to which 3 parts by mass of an isocyanate curing agent was added as the curing agent. The obtained decorative sheet and decorative plate were evaluated as described above. Table 2 shows the evaluation results.

TABLE 2

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Base material | Resin | PET | PP | PP | PP | PP | PP | PP | PP | PP | PP | PP |
| | Thickness (μm) | 250 | 100 | 600 | 250 | 250 | 250 | 250 | 250 | 250 | 250 | 250 |
| | Rzjis (μm) | 1< | 4 | 4 | 7 | 4 | 4 | 4 | 4 | 4 | 4 | 4 |
| Primer layer Matting agent | Average particle diameter (μm) | 3 | 3 | 3 | 3 | 3 | 3 | 3 | 3 | 3 | 3 | 3 |
| | Amount (parts by mass) | 6 | 6 | 6 | 6 | 6 | 6 | 6 | 6 | 6 | 6 | 6 |
| Thickness of surface-protecting layer (μm) | | 10 | 10 | 10 | 10 | 5 | 20 | 5 | 20 | 10 | 10 | 10 |
| Resin curing method | | EB | EB | EB | EB | EB | EB | EB | EB | EB | EB | Two component |
| | Crack elongation (%) | 13 | 15 | 15 | 15 | 24 | 5 | 15 | 15 | 9 | 21 | 15 |
| Evaluation | Specularity (sheet) (visual observation) | A | A | A | C | C | A | C | A | A | A | A |
| | Specularity (decorative plate) (visual observation) | C | C | A | C | C | A | C | A | A | A | A |
| | Concealing properties | A | C | A | A | A | A | A | A | A | A | A |
| | Processability (2R bending) | A | A | A | A | A | C | B | A | C | A | A |
| | Processability (springback) | B | A | C | A | A | C | A | B | B | A | A |
| | Heat resistance | C | A | A | A | A | A | A | A | A | A | A |
| | Scratch resistance | C | A | A | A | A | A | A | C | A | C | C |
| | Blocking property (after primer layer formation) | A | A | A | A | A | A | A | A | A | A | A |
| | Blocking property (after surface-protecting layer formation) | B | A | A | A | A | B | A | B | A | A | A |

PP: Colored polypropylene resin sheet
PET: Amorphous polyethylene terephthalate resin seat It was confirmed that the decorative sheets and decorative plates of the present invention showed excellent results in all of the evaluation criteria.

The decorative sheet of Comparative Example 1, which used an amorphous polyethylene terephthalate resin seat as the base sheet, showed excellent specularity as a decorative sheet; however, when it was processed into a decorative plate, the specularity decreased due to the irregularities of the base plate, and the heat resistance and scratch resistance were also not satisfactory. Similarly, the decorative sheet of Comparative Example 2, whose base sheet had a thickness of 100 μm, showed excellent specularity as a decorative sheet; however, when it was processed into a decorative plate, the specularity decreased due to the irregularities of the base plate, and the concealing properties were also not satisfactory. The decorative sheet of Comparative Example 3, whose base sheet had a thickness as thick as 600 μm, showed excellent specularity; however, the end face of the decorative sheet was detached (springback occurred) during the processing steps with respect to a base plate.

The decorative sheet of Comparative Example 4, whose base sheet had a ten-point mean roughness (Rzjis) as large as 7, and the decorative sheet of Comparative Example 5, whose surface-protecting layer had a thickness as thin as 5 μm, showed no specularity. As to the decorative sheet of Comparative Example 6, whose surface-protecting layer had a thickness as thick as 20 μm, cracking occurred when 2R bending was performed, indicating that sufficient processability was not obtained.

The decorative sheet of Comparative Example 7, whose surface-protecting layer had a thickness as thin as 5 μm, had a crack elongation of 15%, which is the same crack elongation as that obtained in Example 1; however, this sheet showed no specularity as in Comparative Example 5. The decorative sheet of Comparative Example 8, whose surface-protecting layer had a thickness as thick as 20 μm, had a crack elongation of 15%, which is the same crack elongation as that obtained in Example 1, and showed excellent results in terms of the evaluation of 2R bending; however, the scratch resistance was unsatisfactory. As for the decorative sheet of Comparative Example 9, which had a crack elongation as low as 9%, cracking occurred when 2R bending was performed; it was thus confirmed that sufficient processability was not obtained. The decorative sheet of Comparative Example 10, which had a crack elongation as high as 21%, had a soft decorative sheet surface, and the scratch resistance was unsatisfactory. As for Comparative Example 11, whose surface-protecting layer was a cured urethane resin, the hardness of the surface-protecting layer was insufficient, and the scratch resistance was unsatisfactory.

These results of the Examples and Comparative Examples confirm that the decorative sheets and decorative plates had a balance of excellent specularity, excellent surface properties, and excellent processability in which neither springback nor cracking occurred during the processing steps.

INDUSTRIAL APPLICABILITY

The mirror surface decorative sheet of the present invention is bonded to a base material such as a metal plate, an inorganic plate (e.g., a plaster board), or a wood plate (e.g., MDF, particleboard, and laminated board), and is suitably used as a mirror surface decorative plate for architectural interior and exterior materials, building materials, furniture, and various components for home appliances, etc., in particular, kitchen products, interior materials, such as bathroom shelves and bathroom doors.

EXPLANATION OF REFERENCE NUMERALS

1. Base sheet
2. Primer Layer

3. Surface-Protecting Layer
4. Rear Primer Layer
5. Masking Film
6. Base Resin Layer
7. Support Resin Layer
10. Mirror Surface Decorative Sheet
20. Mirror Surface Decorative Plate
21. Base Plate
22. Adhesive Layer

The invention claimed is:

1. A mirror surface decorative sheet comprising at least a base sheet and a surface-protecting layer, and having a crack elongation as measured by the following method of 10 to 20%,
   the base sheet being formed of a polypropylene resin, the base sheet having a thickness of 150 to 500 µm, the base sheet having a ten-point mean roughness (Rzjis) of a surface that is on the surface-protecting layer side as measured according to JIS B 0601: 2001 of 5 µm or less,
   the surface-protecting layer being a cured product of an ionizing radiation-curable resin composition, the surface-protecting layer having a thickness of 7 to 17 µm:
Measurement of crack elongation:
   a rectangular test sample is prepared according to JIS K 7127 using a decorative sheet, placed in a temperature environment of 70° C., and pulled at an arbitrary elongation using a tensile tester at a tensile rate of 20 mm/min, an 80-mm distance between chucks, and a width of 25 mm; thereafter, the test sample between the chucks is colored with a whiteboard marker, the colored portion is wiped off with cloth, and the degree of elongation at which the color cannot be wiped off due to the occurrence of cracking is determined as a crack elongation.

2. The mirror surface decorative sheet according to claim 1, further comprising a primer layer formed of a resin composition A containing a binder resin A and a matting agent A between the base sheet and the surface-protecting layer,
   wherein the matting agent A has an average particle diameter of 0.5 to 8 µm, and the matting agent A is contained in an amount of 0.5 to 20 parts by mass, per 100 parts by mass of the binder resin A.

3. The mirror surface decorative sheet according to claim 1, further comprising a rear primer layer formed of a resin composition B containing a binder resin B and a matting agent B on a side of the base sheet opposite to the side comprising the surface-protecting layer,
   wherein the matting agent B has an average particle diameter of 0.5 to 8 µm, and the matting agent B is contained in an amount of 0.5 to 20 parts by mass, per 100 parts by mass of the binder resin B.

4. The mirror surface decorative sheet according to claim 1, wherein the ionizing radiation-curable resin contained in the ionizing radiation-curable resin composition is an electron beam-curable resin.

5. The mirror surface decorative sheet according to claim 1, wherein the surface-protecting layer contains a scratch-resistant filler in an amount of 0.5 to 12 parts by mass, per 100 parts by mass of the ionizing radiation-curable resin contained in the ionizing radiation-curable resin composition.

6. The mirror surface decorative sheet according to claim 1, further comprising a masking film on the surface-protecting layer.

7. A mirror surface decorative plate comprising a base plate, an adhesive layer, and the mirror surface decorative sheet of claim 1, in this order.

8. The mirror surface decorative sheet according to claim 2, further comprising a rear primer layer formed of a resin composition B containing a binder resin B and a matting agent B on a side of the base sheet opposite to the side comprising the surface-protecting layer,
   wherein the matting agent B has an average particle diameter of 0.5 to 8 µm, and the matting agent B is contained in an amount of 0.5 to 20 parts by mass, per 100 parts by mass of the binder resin B.

9. The mirror surface decorative sheet according to claim 2, wherein the ionizing radiation-curable resin contained in the ionizing radiation-curable resin composition is an electron beam-curable resin.

10. The mirror surface decorative sheet according to claim 2, wherein the surface-protecting layer contains a scratch-resistant filler in an amount of 0.5 to 12 parts by mass, per 100 parts by mass of the ionizing radiation-curable resin contained in the ionizing radiation-curable resin composition.

11. The mirror surface decorative sheet according to claim 2, further comprising a masking film on the surface-protecting layer.

12. A mirror surface decorative plate comprising a base plate, an adhesive layer, and the mirror surface decorative sheet of claim 2, in this order.

* * * * *